(12) United States Patent
Komiya et al.

(10) Patent No.: US 7,009,589 B1
(45) Date of Patent: Mar. 7, 2006

(54) ACTIVE MATRIX TYPE ELECTROLUMINESCENCE DISPLAY DEVICE

(75) Inventors: Naoaki Komiya, Ogaki (JP); Masahiro Okuyama, Inazawa (JP)

(73) Assignee: Sanyo Electric Co. Ltd., (JP)

( * ) Notice: Subject to any disclaimer, the term of this patent is extended or adjusted under 35 U.S.C. 154(b) by 677 days.

(21) Appl. No.: 09/671,856

(22) Filed: Sep. 27, 2000

(30) Foreign Application Priority Data

Sep. 29, 1999 (JP) ................................. 11-277094

(51) Int. Cl.
*G09G 3/30* (2006.01)

(52) U.S. Cl. ..................... 345/76; 345/45; 315/169.3

(58) Field of Classification Search .............. 345/74.1, 345/76, 45–46, 36; 315/169.1, 169.3, 169.4
See application file for complete search history.

(56) References Cited

U.S. PATENT DOCUMENTS

| | | | | |
|---|---|---|---|---|
| 5,235,253 | A | * | 8/1993 | Sato ........................ 315/169.3 |
| 6,005,350 | A | * | 12/1999 | Hachiya et al. ............. 315/156 |
| 6,072,450 | A | * | 6/2000 | Yamada et al. ............... 345/76 |
| 6,072,477 | A | * | 6/2000 | Ueno ......................... 345/211 |
| 6,252,566 | B1 | * | 6/2001 | Maurice ...................... 345/55 |
| 6,529,178 | B1 | * | 3/2003 | Kimura ....................... 345/76 |
| 6,542,138 | B1 | * | 4/2003 | Shannon et al. .............. 345/76 |
| 6,545,424 | B1 | | 4/2003 | Ozawa | |

FOREIGN PATENT DOCUMENTS

| | | |
|---|---|---|
| JP | 7270825 | 10/1995 |
| JP | 11024604 | 1/1999 |
| JP | 11202293 | 7/1999 |

OTHER PUBLICATIONS

English abstract for JP7270825.
English abstract for JP11202293.
English abstract for JP11024604.

* cited by examiner

*Primary Examiner*—Alexander Eisen
*Assistant Examiner*—Kimnhung Nguyen
(74) *Attorney, Agent, or Firm*—Cantor Colburn LLP

(57) ABSTRACT

An active matrix type electroluminescence display device comprises a plurality of display pixels GS11, GS12, GS13, etc. arranged in a matrix of rows and columns, each display pixel including an EL element, a first thin film transistor in which a display signal is applied to the drain and which is switched on and off in response to a select signal, a capacitance with one end connected to the source of the first thin film transistor for maintaining a voltage corresponding to the display signal, and a second thin film transistor for driving the EL element based on the display signal. The other ends of the capacitance of row display pixels are connected to and shared by a plurality of first capacitance lines HLA1, HLA2, HLA3, HLAi. Both ends of the plurality of first capacitance lines HLA1, HLA2, HLA3 are connected to and shared by second capacitance lines HLB1 and HLB2. A constant voltage is supplied to the second capacitance line.

6 Claims, 2 Drawing Sheets

ACTIVE MATRIX TYPE ELECTROLUMINESCENCE DISPLAY DEVICE

BACKGROUND OF THE INVENTION

1. Field of the Invention

The present invention relates to an active matrix type EL display device with display pixels including an electroluminescence element (hereinafter referred to as an EL element) and a thin film transistor arranged in a matrix form, and particularly to an art for stably illuminating each display pixel by preventing voltage drops in capacitance lines connected to, and shared by, the display pixels.

2. Description of the Related Art

EL elements have various advantages, including, because they are self illuminating elements, an obviated need for a backlight as required in liquid crystal display devices and unlimited viewing angle. Because of these advantages, it is widely expected that EL elements will be use in the next generation of display devices.

Two basic methods are known for driving EL elements. One of these is called a simple, or passive, matrix type, with the other, which employs a thin film transistor as a switching element, is known as an active matrix type. The active matrix type does not suffer from cross talk between the column and row electrodes, which is a problem known in the simple matrix type. Moreover, because the EL elements are driven with a lower current density, a high luminescence efficiency can be expected.

FIG. 3 is a circuit diagram schematically showing an active matrix type EL display device. In the figure, the display pixels GS1, GS2, GS3, . . . GSj are arranged in one row. One display pixel GS1 includes an organic EL element 11, a first thin film transistor 12 (an N channel type transistor) acting as a switching element in which a display signal DATA1 is applied to the drain and which is switched on and off in response to a select signal SCAN, a capacitance 13 which is charged by the display signal DATA1 supplied when the first thin film transistor 12 is switched on and which maintains a maintenance voltage Vh when the first thin film transistor 12 is switched off, and a second thin film transistor 14 (a P channel type transistor), with its drain connected to a drive supply voltage Vdd and its source connected to the anode of the organic EL element 11, for driving the organic EL element when the maintenance voltage Vh is supplied from the capacitance 13 at the gate.

The other display pixels GS2, GS3, GSj have an equivalent structure. Although the display pixels are also arranged in the column direction, this arrangement is not shown in the figure in order to simplify the drawing. Reference numeral 15 represents a gate signal line which is connected to and shared by each of the display pixels GS1, GS2, GS3, . . . GSj for supplying a select signal SCAN. Reference numeral 16 represents a gate drive circuit for supplying the select signal SCAN to the gate signal line. Reference numeral 17 represents a capacitance line which is connected to and shared by the capacitance 13 of each of the display pixels.

The select signal SCAN becomes H level during a selected one horizontal scan period (1H), and the first thin film transistor 12 is then switched on based on the select signal. Next, a display signal DATA1 is supplied to one end of the capacitance 13 and the capacitance 13 is charged with a voltage Vh corresponding to the display signal DATA1. The voltage Vh is maintained in the capacitance 13 for a period of one vertical scan period (1V) even after the first thin film transistor 12 is switched off due to the select signal SCAN becoming L level. Because this voltage is supplied to the gate of the second thin film transistor 14, the second thin film transistor 14 becomes continuous in response to the voltage Vh and the organic EL element 11 is illuminated.

However, in larger size conventional EL display devices, differences in luminance throughout the display device have been observed.

The capacitance line 17 is formed from chrome evaporated on a glass substrate, in consideration of heat endurance and ease of processing. Because the capacitance line 17 is extended on the display region in order to be connected to and shared by each of the display pixels GS1, GS2, GS3, . . . GSj, a resistance and a floating capacitance are inevitably generated. For example, in an active matrix type EL display device having a number of pixels of 220×848, the resistance value of one capacitance line 17 is approximately 320 $\Omega$ and the floating capacitance is approximately 20 pf. The resistance and floating value increase as the number of pixels increases.

The capacitance line 17 must be kept constant because it acts as a reference potential for charging the display signal DATA1. However, when the resistance value of the capacitance line 17 is large, the potential of the capacitance line 17 becomes unstable when the active matrix type EL display device is driven, causing a problem that the EL element 11 is not illuminated at a luminance corresponding to the display signal DATA1. In other words, a select signal SCAN having an H level is supplied to the gate signal line 15 based on the select signal SCAN and the display signal DATA1 is supplied to one end of the capacitance 13. This causes the display signal DATA1 to be applied to the capacitance 13 and the capacitance 13 is charged. If the resistance of the capacitance line 17 is large, the potential would vary.

SUMMARY OF THE INVENTION

The present invention ensures precise illumination of each display pixel in response to the display signal by supplying a constant voltage from both ends of the capacitance line 17 connected to and shared by each of the display pixels to stabilize the potential of the capacitance line 17.

According to one aspect of the present invention, there is provided an active matrix type EL display device comprising a plurality of display pixels arranged in a matrix of rows and columns, each of the display pixels including an EL element and a capacitance for maintaining a voltage corresponding to a display signal, and a plurality of capacitance lines extending to each row and each of which is connected to and shared by the capacitance of the display pixels, wherein a constant voltage is supplied from both ends of the capacitance lines.

With this structure, because a constant voltage is supplied from both ends of the capacitance lines, voltage drops in the capacitance lines can be prevented, the potential of the capacitance lines can be stabilized, and, thus, the EL element of the display pixels can be precisely illuminated in response to the display signal.

DESCRIPTION OF THE PREFERRED EMBODIMENT

An active matrix type EL display device according to a preferred embodiment of the present invention is described hereinafter referring to FIGS. 1 and 2.

Figure 1:
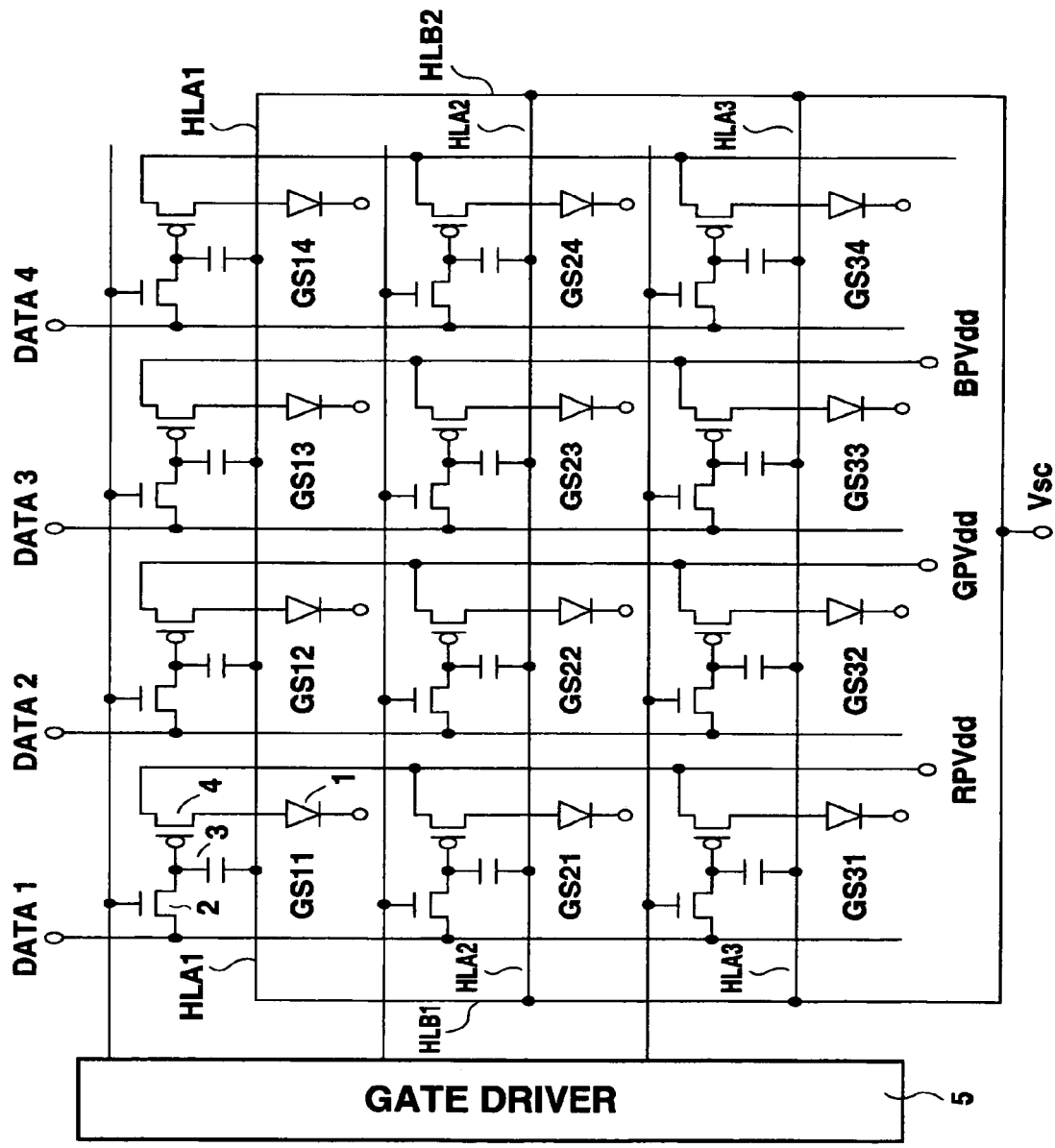
FIG. 1 is a figure illustrating an active type electroluminescence display device according to one embodiment of the present invention.

FIG. 1 is a circuit diagram schematically showing a structure of an active matrix type EL display device. Display pixels GS11, GS12, GS13, . . . GSij, are arranged in rows and columns to form a matrix. Each of the display pixels includes an organic EL element 1, a first thin film transistor 2 in which a display signal DATAj is applied to the drain and which is switched on and off in response to a select signal supplied from a gate signal line GLi, a capacitance 3, and a second thin film transistor 4 for driving the EL element 1 based on the display signal DATAj.

One end of the capacitance 3 is connected to the source of the first thin film transistor 2. The capacitance 3 is charged with a voltage corresponding to the display signal DATAj applied to the drain of the first thin film transistor and the voltage is maintained. The other end of the capacitance 3 is connected to, and shared by, a plurality of first capacitance lines HLA1, HLA2, HLA3, . . . extending in each row. Both ends of the first capacitance lines HLA1, HL2, HLA3, . . . are interconnected by second capacitance lines HLB1 and HLB2. Each of the second capacitance lines HLB1 and HLB2 which forms a net of capacitance lines is pulled out to one side of the display region. The second capacitance lines HLB1 and HLB2 are interconnected and a constant voltage Vsc is applied. The first and second capacitance lines are formed from chrome evaporated on a glass substrate. The capacitance lines have large resistance values, but, because a constant voltage Vsc is applied via the second capacitance lines HLB1 and HLB2 to the first capacitance lines HLA1, HLA2, HLA3, . . . from both sides, a low overall wiring resistance can be achieved for the capacitance lines, and thus, voltage drop can be prevented. Therefore, each capacitance 3 can be uniformly and sufficiently charged with a voltage corresponding to the display signal DATAj. Moreover, even in an organic EL element with a short illuminating time, a voltage corresponding to the display signal DATAj can be maintained, and thus, the illuminating time of the organic EL element can be extended and stable luminance can be obtained.

FIG. 1 shows a full-color EL display device in which three types of display pixels are repeatedly arranged, each type of display pixel having an organic EL element illuminating respectively in red (R), green (G), and blue (B). In other words, a common drive voltage source RPVdd is supplied to the display pixels GS11, GS21, GS31, . . . GSi1 having organic EL elements illuminating in red, a common drive voltage source GPVdd is supplied to the display pixels GS12, GS22, GS32, . . . GSi2 having green illuminating organic EL elements, and a common drive voltage source BPVdd is supplied to the display pixels GS13, GS23, GS33, . . . GSi3, for blue illuminating organic EL elements. A monochrome EL display device can be constructed by arranging display pixels of one type in rows and columns.

A display signal DATA1 is applied to the display pixels arranged in the first column such as GS11, GS21, and GS31; a display signal DATA2 is applied to the display pixels arranged in the second column such as GS12, GS22, and GS32; and so on, such that a display signal DATAj is applied to the display pixels arranged in the jth column such as GS1j, GS2j, and GS3j. A common gate signal line GL1 is connected to the display pixels arranged in the first row such as GS11, GS12, and GS13; a common gate signal line GL2 is connected to the display pixels arranged in the second row such as GS21, GS22, and GS23; and so on such that a common gate signal line GLi is connected to the display pixels arranged in the ith row such as GSi1, GSi2, and GSi3.

Figure 2:
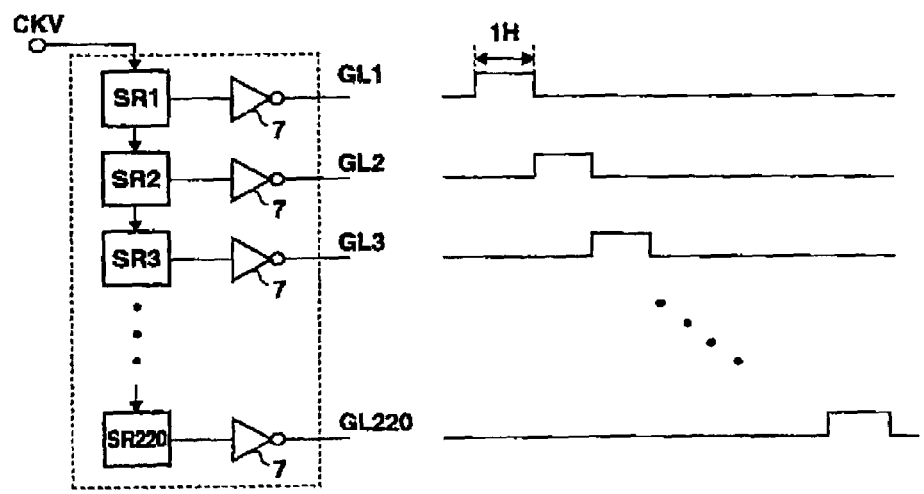
FIG. 2 is a circuit diagram illustrating a gate drive circuit according to the embodiment of the present invention.
Figure 3:
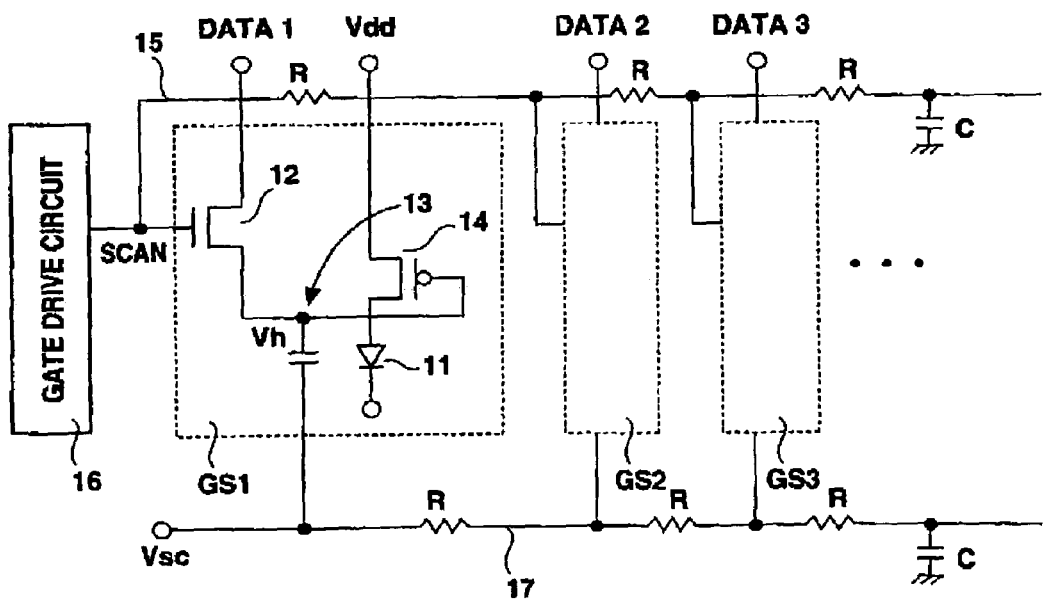
FIG. 3 is a diagram illustrating a conventional active type EL display device.

FIG. 2 is a circuit diagram showing a structure of a gate drive circuit 5. Shift registers SR1 through SR220 are serially connected for sequentially shifting a reference clock CVK supplied from outside by one horizontal scan period (1H). The select signal SCAN, which is the output of each of the shift registers, is transmitted to each of the gate signal lines GL1 through GL220 via buffer amplifiers 7.

In other words, each of the select signals SCAN having a pulse width of one horizontal scan period (1H) is shifted by each of the shift registers SR1 through SR220 and is output sequentially on each of the gate signal lines GL1 through GL220. To correspond to the number of pixels of 220×848 in the active matrix type EL display device in the present example, 220 shift registers are provided in the embodiment. However, the number of shift registers and buffer amplifiers can be modified to suit and correspond to the number of pixels.

The active matrix type EL display device is driven as follows. When a gate signal line GL1 is selected by a select signal SCAN, the display pixels in the first row such as GS11, GS21, and GS31 are selected. At this point, the gate signal line GL1 is increased to the H level.

During one horizontal scan period (1H), display signals DATA1, DATA2, DATA3, . . . DATAj are sequentially supplied to each of the display pixels GS11, GS12, GS13, . . . GS1j from each of the data lines. The display signals DATA1, DATA2, DATA3, . . . DATAj are maintained by a sampling circuit (not shown) and the timing for outputting the signals is controlled via a transfer gate provided for each of the display signal terminals. Because the potential of the first capacitance lines HL1, HL2, HL3, . . . is stabilized in the present invention, the capacitance 3 can be charged to correspond to the display signals DATA1, DATA2, DATA3, . . . DATAj, in each of the display pixels GS11, GS12, GS13, . . . Gs1j. Each of the EL elements 1 can be illuminated at its proper luminance. Similarly, gate signal line GL2 is selected by the next select signal SCAN. These steps are repeated for one vertical scan period (1V).

As described, according to the present invention, the resistance value of one capacitance line can be reduced by supplying a constant voltage from both ends of the capacitance lines. In this manner, the potential of the capacitance line can be stabilized and the EL element of each display pixel can be precisely illuminated in response to the display signals.

What is claimed is:

1. An active matrix type electroluminescence display device comprising:
   a plurality of display pixels arranged in a matrix of rows and columns, each of said display pixels including an electroluminescence element to which one end of a capacitor for maintaining a voltage corresponding to a display signal is connected via a driver transistor; and
   a plurality of capacitor lines extending in a row direction and connected to and shared by the other end of said capacitors of said display pixels; wherein
   a constant voltage is supplied from both ends of said capacitor lines;
   said capacitor is connected to a gate of the driver transistor, which drives the electroluminescence element.

2. An active matrix type electroluminescent display device comprising:

a plurality of display pixels, each including an electroluminescent element, arranged in a matrix of rows and columns, a first thin film transistor in which a display signal is applied to the drain and which is switched on and off in response to a select signal, a capacitor having one end connected to the source of the first thin film transistor and for maintaining a voltage corresponding to said display signal, and a second thin film transistor for driving said electroluminescence element based on said display signal;

a plurality of first capacitor lines, each extending in a row direction and connected to and shared by the other end of capacitors of said display pixels;

a second capacitor line connected to first ends of said plurality of first capacitor lines;

a third capacitor line connected to second ends of said plurality of first capacitor lines; wherein said second and third capacitor lines are connected to a common constant voltage source, and said constant voltage is supplied to said first ends and said second ends of said plurality of first capacitor lines through said second and third capacitor lines.

3. The device of claim 2, wherein
said second capacitor line extends in a column direction on one side of an area in which said plurality of display pixels are arranged in a matrix, and
said third capacitor line extends in a column direction on the other side of the area in which said plurality of display pixels are arranged in a matrix.

4. An active matrix type electroluminescence display device comprising:

a plurality of display pixels, each including an electroluminescence element, arranged in a matrix of rows and columns, a first thin film transistor in which a display signal is applied to the drain and which is switched on and off in response to a select signal, a capacitor having one end connected to the source of the first thin film transistor and for maintaining a voltage corresponding to said display signal, and a second thin film transistor for driving said electroluminescence element based on said display signal;

a plurality of first capacitor lines, each extending in a row direction and connected to and shared by the other end of capacitors of said display pixels;

a second capacitor line connected to first ends of said plurality of first capacitor lines;

a third capacitor line connected to second ends of said plurality of first capacitor lines; and wherein a constant voltage is supplied to said first ends and second ends or said plurality of first capacitor lines through said second and third capacitor lines.

5. The device of claim 4, wherein
said second capacitor line extends in a column direction on one side of an area in which said plurality of display pixels are arranged in matrix, and
said third capacitor line extends in a column direction on the other side of the area in which said plurality of display pixels are arranged in matrix.

6. The device of claim 1 comprising:
a second capacitor line connected to first ends of said plurality of capacitor lines;
a third capacitor line connected to second ends of said plurality of capacitor lines; and
wherein said constant voltage is supplied to said first ends and second ends or said plurality of capacitor lines through said second and third capacitor lines.

* * * * *